Dec. 9, 1952     A. W. FRIEND     2,621,302
BAND PASS VOLTAGE MULTIPLIER NETWORK
FOR PULSED POWER SUPPLIES
Filed Aug. 31, 1949
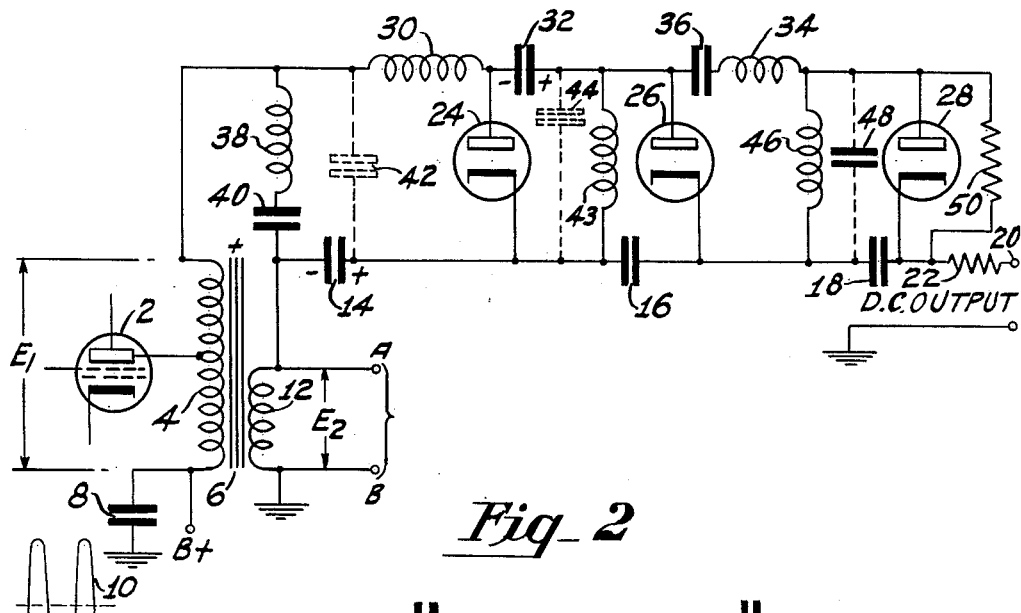
*Fig_1*
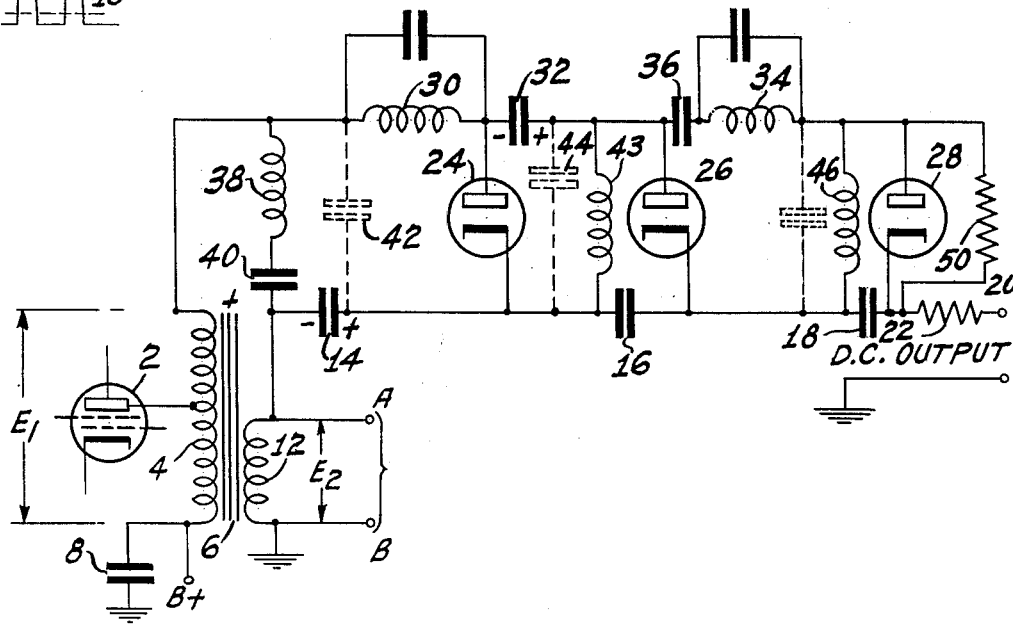
*Fig_2*
INVENTOR
*Albert W. Friend*
BY
ATTORNEY Patented Dec. 9, 1952

2,621,302

UNITED STATES PATENT OFFICE 2,621,302

BAND PASS VOLTAGE MULTIPLIER NETWORK FOR PULSED POWER SUPPLIES

Albert W. Friend, Lawrenceville, N. J., assignor to Radio Corporation of America, a corporation of Delaware Application August 31, 1949, Serial No. 113,365

5 Claims. (Cl. 307—109)

The present invention relates to a power supply system and method for developing high level direct current potentials from a series of unidirectional pulses or from an alternating current or voltage.

The U. S. Patent 2,439,223, April 6, 1948, to Schade and 2,452,013, October 19, 1948, to Friend both show circuits by which a high level direct current potential may be developed from a series of positive pulses and, in particular, how such a system can be applied so as to operate in conjunction with a deflection system of a television receiver or transmitter. Although they differ in detail, they provide means whereby each of a plurality of series-connected condensers is charged to a voltage substantially equal to the peak-to-peak voltage of the pulses supplied to the system. The amount of voltage thus developed is substantially determined by the number of condensers connected in series.

Whereas such systems are adequate, the present invention, by permitting recovery of energy stored in the stronger harmonics as well as the fundamental of the pulses supplied, provides a more powerful and efficient power supply having better voltage regulation under heavy load conditions.

If the source of pulses is inductive, the shunt capacity lowers the resonant frequency and therefore the maximum rate of change of current in the system and accordingly the maximum voltage that may be developed.

Where the source of pulses is required to have a given resonant frequency in conjunction with associated circuits, it is necessary to reduce the amount of inductance of said source, and therefore the maximum voltage available.

In accordance with another feature of this invention, dissipation of direct current energy is prevented by minimizing the resistance in the path of the direct current.

According to this invention, the stray capacities and the lumped parameters of the power supply system are so chosen and arranged that they form a pass-band filter capable of passing not only the pulse repetition frequency but also any harmonics of this frequency that have substantial energy content. Or, in other words, the impedance presented to all of the important harmonic frequencies is relatively high and uniform.

If the source of pulses has a resonant frequency, it is possible to design the pass-band of the power supply system so as to include this frequency and thereby take advantage of the resonance of the source of pulses so as to develop a higher voltage.

Another aspect of this invention is to provide a means whereby the pulses introduced into the power supply system are reflected after passing through the system in such manner as to reinforce pulses that are later applied to the system and so develop a higher voltage. Whereas this idea is well adapted to use with the power supply of this invention, it is advantageous to employ it in connection with systems such as described in the above patents.

Accordingly, it is an object of this invention to provide an improved power supply that is capable of developing high potential direct current voltages from a series of pulses or from radio frequency voltages.

It is still a further object of the invention to provide a high voltage D. C. power supply in which full advantage is taken of the energy content of all the important harmonics of the pulses supplied to it.

A still further object of the invention is to provide a method and means whereby high voltage direct current potential may be developed from a series of uniformly recurring pulses in which the stray parameters of the circuit are combined with lumped parameters in such a manner that the power supply, as a whole, has a band-pass characteristic capable of passing the pulse repetition rate frequency and predetermined number of its harmonics.

These and other objects will become apparent from a consideration of the drawing in which:

Figure 1 illustrates by circuit diagram a power supply embodying the principles of the invention; and Figure 2 shows also by circuit diagram a power supply embodying the principles of the invention in which the components of the power supply system form an M-derived filter from the filter shown in Figure 1.

Figure 1 shows a power supply embodying the principles of this invention in conjunction with part of a deflection system such as normally employed in television sweep circuits. A source 2 of sawtooth current waves is connected to the primary 4 of the autotransformer 6, one end of the autotransformer being at A. C. ground potential but at positive direct current potential. The direct current potential is blocked from reaching ground by condenser 8 and is supplied through part of the primary 4 to the plate of the driver 2. The voltage waveform appearing across the primary 4 is indicated by numeral 10 and is of such polarity that the top of the primary 4, as shown in the drawing, is positive. The direction of winding of secondary 12 is such that this same pulse produces a negative polarity as shown, the magnitude of the voltage thus developed of course depending upon the turns ratio. The voltage across the primary is indicated as $E_1$ and across the secondary as $E_2$.

Any suitable deflection circuit can be connected across the secondary 12 at points A and B, but because this invention does not rely upon the details of such circuits, none is shown. Suffice it to say that deflection circuits used are inductive in nature and so supply a voltage pulse of the waveform indicated by numeral 10.

A plurality of load condensers 14, 16 and 18 are connected between the point A of the secondary 12 and the output terminal 20 of the power supply via a protective resistor 22. Between the positive terminal of the primary 4 and the right-hand plate of each of the load condensers unilateral conducting devices which may be diodes 24, 26 and 28 may be connected in like polarity. In between the plates of the diodes and in series with the primary 4 and with each other are an inductance 30 and condenser 32, and inductance 34 and condenser 36. Ahead of the diode 24 and the load condenser 14 an inductance 38 and a blocking condenser 40 are connected across the sources of pulses or alternating current energy. The phantom condenser 42 represents a stray capacity of the system including that of the winding 4 and that coupled from the other winding 12 of the transformer 6, plus that of all leads and components from the transformer 6 to the left-hand terminal of the inductance 30.

An inductance 43 is connected essentially in parallel with diode 26 and the condenser 44 which represents the distributed capacitance encountered between the inductors 30 and 34. Another inductance 46 is connected essentially in parallel with the diode 28 and a third phantom condenser 48 which represents the distributed capacitance between the inductor 34 and the end of the filter and its terminating load resistor 50. The terminal resistor 50 may be provided in parallel with the diode 28, its value depending upon the conditions existing in the circuit. The capacitances of the storage condensers 14, 16 and 18 may be made to be of such high values that their effects upon the filter network characteristics are entirely negligible.

The overall operation of the circuit described in detail above can now be given. Although the source of pulses is shown to be a sweep circuit such as used in television systems, it is understood that this could be a source of alternating current or unidirectional pulses of any type. Assuming that all the condensers in the circuit are discharged, let us examine what happens when the first positive pulse is developed across the inductance 38, the reactance of condenser 40 being so small that it may be neglected. If the polarity of the pulse is such as to make the plate of the diode positive, the condenser 14 will tend to be charged to essentially the peak value of the pulse shown as $(E_1+E_2)$, but practically no voltage is developed at points in the system beyond the diode 24, unless the condenser 14 becomes fully charged, because, while the condenser 14 is charging it is essentially a short circuit. During the time between pulses, however, when no voltage is impressed upon the system, the charge just deposited on the plates of condenser 14 is shared with the blocking condenser 32 in the loop containing condenser 40 and inductances 30, 38 and 43. Unless there was more than sufficient energy to charge the condenser 14 during the first pulse, the condensers beyond inductance 43 receive no charge during this time because there is no D. C. path for the current to follow.

With the condenser 14 and condenser 32 charged in a polarity as shown, a second pulse is introduced into the system, but this time diode 24 will conduct much less, or not at all, because its cathode is held at a potential nearly equal to the positive potential of the applied pulse by load condenser 14. After condenser 14 is fully charged, diode 26 is subjected to essentially the full pulse voltage, minus only the small voltage which may already have been developed across condenser 16 during and after completion of the charging period of the condenser 14. The same voltage is of course supplied across inductance 43 as a part of the filter network, but due to the much lower surge impedance of the diode 26 and condenser 16, little current passes through it. In this manner, condenser 16 is charged with the polarity shown, and the voltage between the cathode of diode 26 and ground becomes equal to the sum of the voltages across condensers 14 and 16. This is equal to approximately twice the peak-to-peak voltage of the pulses supplied to the system, or almost equal to $2(E_1+E_2)$. During the rest period between pulses condenser 16 shares its charge with condenser 36. Capacitor 18 is charged through diode 28 in a like manner and the process continues to be repeated, as often as is required to develop and to maintain the desired voltage. Due to the fact that the condensers 32 and 36 are usually small compared with the condensers 16 and 18, very little voltage is lost in sharing the charge between each pair.

The summation of the voltages 14, 16 and 18 is thus supplied through resistor 22 to terminal 20. It will be noted that starting at the positive terminal of the source of pulses that a D. C. path can be traced through the system via diode 24, inductance 43, diode 26, inductance 46, diode 28, resistor 22 through the load to ground, and from ground to the lower side of primary 4. The requirement that such a D. C. path exists governs the location of the diodes and therefore each diode must be connected between the positive side of the circuit and the right-hand plate of the condenser which it charges.

An important aspect of the invention lies in the arrangement of the various components of the circuit in such manner that the distributed parameters are incorporated so as to form a band-pass filter of the desired characteristics. Reference is made to "Radio Engineers' Handbook" by Frederick Emmons Terman, first edition, McGraw-Hill Book Company, New York, 1943, in which the type of filter produced is illustrated under Type IV, column B, page 231. As will be noted, this filter is comprised of two circuits which consist of inductance and capacitance in parallel, and which are connected by an inductance and condenser connected in series. The ratios of the various components can be determined by the formulas on page 230.

In Figure 1 the inductance 38 and the stray capacitance 42, which would normally be the output capacitance of the source of pulses, form the first parallel shunt circuit of the $\pi$ filter; and the inductance 43 and the capacitance 44 form the next parallel shunt circuit of an extended filter. The inductance 30 and capacitance 32 are connected in series between the terminals of these respective circuits. In this way, the distributed capacitance, which is the most important of the stray parameters of the network is incorporated in a subdivided manner into the filter, and is not all permitted to act as a direct shunt across the transformer winding, where it would deteriorate the performance. If the pulses are derived from an inductive source such as a television horizontal deflection circuit, the excess distributed capacitance of the rectifiers would so lower the resonant frequency that the induced voltage would be greatly reduced and the retrace time would be too long, unless turns were removed from the transformer to restore the correct resonance. Again this correction lowers the output pulse voltage to the rectifiers so that additional stages are required to attain the same voltage. The filter network isolates most of this distributed capacitance into small portions which become parts of the network, so that the transformer may be wound for maximum output voltage. The uniform broad-band characteristic of the filter is designed to admit all important harmonic components of the pulse, from any source or generator, so that the maximum energy is available to be delivered to the rectifiers, and thence to the D. C. output. These conditions were not altogether fulfilled by the systems discussed in the above patents.

When it is desired to use more than one of these filters it is desirable and necessary for compliance with the fundamental filter design that the shunting intersection inductances, such as 43, be made equal to half the terminal inductances, 38 and 46, of the single section $\pi$ filters and that the shunt stray capacitance 44 be equal to twice the capacitance in one of the single sections of the $\pi$ filters, as they appear in the terminations at 42 and 48. If the stray capacity at this point in the circuit is insufficient, it may be padded to any desired amount by the addition of condensers across the line.

The two diodes 24 and 26 and series capacitors 32 and 36 are located as indicated in common with two adjoining filter sections so that their stray capacitances across the line may be utilized to build-up the value of the capacitance 44 without the addition of a component part for this condenser. By deducting these capacitances from 42, which should be of ½ the value of 44, the system impedance for a given filter pass-band width may be increased and the performance of the system improved thereby.

If the joint section capacitance across the circuit, at an intermediate point where two successive $\pi$ filters join, is then made equal to twice the capacitance on the extreme ends of said filters, that is, if capacitor 44 is equal to twice the capacitance of 48 or 42, the terminating resistance is given by the formula $$R = [\pi(f_2 - f_1) C_{44}]^{-1}$$

wherein the frequencies $f_2$ and $f_1$ are those between which the attenuation of the circuit is a minimum and which define the "pass-band." The condensers 32 and 36 are to be equal and their size is given by the formula $$C_{32} = C_{36} = (f_2 - f_1)/4\pi f_1 f_2 R$$

The inductances 30 and 34 are also equal and their value is represented by the expression $$L_{30} = L_{34} = R/\pi(f_2 - f_1)$$

As pointed out above, the intermediate shunt inductance 43 is equal to half the values of the inductances 38 and 46 and its value is given by the expression $$L_{43} = \frac{L_{38}}{2} = \frac{L_{40}}{2} = (f_2 - f_1) R/4\pi f_1 f_2$$

Of course, the two adjoining $\pi$ sections could be connected one after the other, but a reduction in the number of component parts is obtained by inserting a single inductance 43 having the same value as two parallel inductances of the tuned circuits and a single capacitance 44 having a value equal to the two condensers of the tuned circuits connected in parallel.

The circuit shown in Figure 2 is the same as that of Figure 1 with the exception that it is M-derived by a design of inductances 30 and 34 so that, with their distributed capacitances 52 and 54, they form series arm components of a $\pi$ filter such as illustrated under Type VII, page 231 of the above-identified book by Terman. Other parts of the circuit are indicated by the same numerals as used in Figures 1 and 2. With these changes and with the same distributed input capacitance a network such as illustrated in Figure 2 has a higher characteristic impedance for the same useful portion of a band-pass characteristic and thus presents less loading to the driving system. On the other hand, it may be made to present a more uniform loading over the frequency pass-band than is obtainable on either of the circuits of Figures 1 and 2.

If the circuits just described are thought of as being a transmission line having a definite characteristic impedance, it can be seen that the pulses introduced into this system will travel towards diode 28 and will either be absorbed or reflected, depending upon the value of the terminating resistance 50. According to a well known theory, if this resistance is equal to the characteristic impedance of the line, no reflections occur and therefore no pulses will travel back towards the source. If, on the other hand, the resistor 50 is omitted and the transmission line, as it were, is terminated by an open end, it is well known that the pulses will return along the transmission line in their original polarity. Accordingly, it is possible that they may again charge up the condensers 14, 16 and 18 as they pass the diodes 24, 26 and 28, respectively.

It is believed that the power supply of this invention is a step forward in the art because it makes possible the attainment of higher voltages from a series of unidirectional pulses, or alternating current waves, and permits an increase in the voltage regulation under severe loads.

I claim:

1. A power supply for developing a substantially uniform direct current voltage from a series of unidirectional pulses comprising a plurality of rectifiers, a plurality of energy storage units, each of said storage units being in series with one of said rectifiers, said storage units being connected in series, means for applying a series of pulses to said rectifiers, the circuit parameters of the rectifier circuits being such as to reflect a uniform impedance for a band of frequencies including the pulse repetition frequency and at least one of its harmonics.

2. A power supply adapted to develop a smooth D. C. voltage from a series of unidirectional pulses comprising in combination a source of pulses having two output terminals, a plurality of condensers across which the D. C. voltage is to be developed connected in series with one of said output terminals, a unilateral conducting device having a given electrode connected to the side of each of said condensers remote from the terminal to which they are connected, the other electrode of said unilateral devices all being coupled to the other output terminal, and a network including said unilateral devices being of such character that it has a pass band characteristic sufficiently broad to permit the passage of the fundamental and at least one harmonic of said pulses.

3. Power supply apparatus as described in claim 1 wherein the end of said network that is remote from said two output terminals has a terminal impedance such as to reflect voltage waves impinging on it with the same polarity.

4. A power supply adapted to develop a smooth voltage from a series of pulses comprising in combination a source of pulses having two output terminals at least one condenser across which the smooth voltage is to be developed, said condenser being connected in series with one of said output terminals, a unilateral conducting device having one electrode coupled to the other output terminal and the other electrode coupled to the side of said condenser that is remote from the output terminal to which the condenser is connected, and means including said unilateral device adapted to reflect said pulses and their harmonics back to said unilateral device.

5. A power supply comprising in combination a source of pulses having two output terminals, a first group of condensers connected in series with one of said output terminals, said condensers forming one side of a transmission line, the other side of said transmission line being comprised of series connected groups of impedance including an inductance, two condensers and another inductance connected in the order named, one end of said inductance being connected to the other output terminal, a unilateral conducting device connected between each junction of condensers in said first group and the junction of an inductance and condenser in said group of impedances, the values of the distributed parameters and said inductances and condensers being such as to pass the fundamental and at least one harmonic of said pulses, said transmission line having a terminal impedance at the end remote from said output terminal such as to reflect the pulses reaching it with the same polarity.

ALBERT W. FRIEND.

REFERENCES CITED

The following references are of record in the file of this patent:

UNITED STATES PATENTS

| Number | Name | Date |
|---|---|---|
| 1,666,473 | Slepian | Apr. 17, 1928 |
| 1,974,328 | Bouwers | Sept. 18, 1934 |
| 2,045,034 | Kuntke | June 23, 1936 |
| 2,056,376 | Travis | Oct. 6, 1936 |
| 2,149,077 | Vance | Feb. 28, 1939 |
| 2,401,416 | Eaton | June 4, 1946 |
| 2,452,013 | Friend | Oct. 19, 1948 |

FOREIGN PATENTS

| Number | Country | Date |
|---|---|---|
| 640,887 | Germany | Dec. 30, 1934 |